United States Patent [19]
Bunker

[11] Patent Number: 6,000,908
[45] Date of Patent: *Dec. 14, 1999

[54] COOLING FOR DOUBLE-WALL STRUCTURES

[75] Inventor: Ronald Scott Bunker, Niskayuna, N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/744,135

[22] Filed: Nov. 5, 1996

[51] Int. Cl.[6] .............................. F01D 5/18; F01D 9/06; F01D 25/12; F01D 25/14

[52] U.S. Cl. ..................... 416/95; 416/96 R; 416/97 R; 415/115; 415/175; 415/176; 415/178; 60/752; 165/908

[58] Field of Search .................................. 415/115, 116, 415/175, 176, 177, 178; 416/95, 96 R, 96 A, 97 R, 97 A; 60/752, 754; 165/908

[56] References Cited

U.S. PATENT DOCUMENTS

| | | |
|---|---|---|
| 5,241,827 | 9/1993 | Lampes ...................................... 60/754 |
| 5,328,331 | 7/1994 | Bunker et al. . |
| 5,467,815 | 11/1995 | Haumann et al. ....................... 165/908 |
| 5,498,133 | 3/1996 | Lee ......................................... 416/97 R |
| 5,586,866 | 12/1996 | Wettstein .............................. 416/96 A |

FOREIGN PATENT DOCUMENTS

| | | | |
|---|---|---|---|
| 2404297 | 8/1974 | Germany ............................... 415/116 |
| 0104507 | 8/1980 | Japan ................................... 416/96 A |

*Primary Examiner*—Christopher Verdier
*Attorney, Agent, or Firm*—Patrick Patnode; Marvin Snyder

[57] ABSTRACT

A coolable double walled structure, for use and exposure in a hot gas flow environment, includes a jet issuing wall, a target wall spaced from the jet issuing wall defining at least one cavity therebetween. The jet issuing wall includes at least one impingement rail having a greater thickness than the jet issuing wall such that a bottom portion of the impingement rail extends within the cavity formed between the jet issuing wall and the target wall. A number of impingement ports are disposed within each impingement rail to provide flow communication through the jet issuing wall to the target wall. Due to the relatively thick dimensions of the impingement rail, the impingement ports disposed within respective impingement rails can be directionalized so as to provide for local cooling needs. In one embodiment, the entry areas of the impingement ports are bell shaped so as to lower inlet pressure loss. In another embodiment, the exit area immediately surrounding the impingement ports is rounded for lower post-impingement pressure drop.

1 Claim, 4 Drawing Sheets

COOLING FOR DOUBLE-WALL STRUCTURES

BACKGROUND OF THE INVENTION

This invention relates generally to turbine combustors and more particularly relates to improved impingement jet flow through double-wall structures.

Traditional turbine combustors use diffusion flames in which fuel and air enter the combustion chamber separately. This process of mixing and burning produces flame temperatures typically exceeding 3900° F. Since the maximum temperatures conventional combustor liners, transition pieces or other hot section components are generally capable of withstanding is in the order of about 1500° F., steps to protect these components from excessive temperatures must be taken.

Currently, it is known in the art to cool parts using heat transfer across walls having hot and cold surfaces by flowing a cooling fluid in contact with the cold surface to remove the heat transferred across from the hot surface. Among the various cooling techniques that have been used to cool hot section components are impingement cooling and film cooling.

Current advanced combustors typically premix the maximum possible amount of air with the fuel entering the combustion chamber for NOx reduction. Accordingly, little or no cooling air remains available, making film-cooling of the hot components extremely difficult.

Combustors that utilize impingement cooling use either impingement inserts or impingement covers to deliver high velocity impingement jets onto the hot component surfaces requiring cooling. The term "impingement cooling," as used herein, is defined as a variation of convection cooling in which the cooling medium is directed as a sheet or jet towards a wall to be cooled, thereby providing increased heat transfer in particular localities. Conventional impingement devices have impingement holes that are essentially flow orifices, which flow orifices lack the length-to-diameter ratios necessary to more fully develop impingement jet flow or to directionalize the impingement jet flow. Conventional means of impingement within turbine combustors or other components is via a series of coolant jets developed through a sheet metal plate. Typical plates may have jet orifice holes drilled, punched, or laser machined in a desired pattern, and to desired hole diameters. The plates may be either flat, or of small curvature, or may be formed into more complex shapes for specific regional applications within the turbine. Typical materials may be for example, stainless steel, or nickel based corrosion resistant alloys for high temperature exposure. In all cases, these plates are thin, providing jet hole length to diameter ratios generally not exceeding unity. Such jet hole geometries are insufficient to provide a developed flow, but instead issue the cooling jet with a flow structure that will be more susceptible to spreading, and therefore less effective in providing impingement cooling at the target surface.

Impingement sheet metal jet plates are generally maintained at a constant distance from the target wall. A balance is sought between the individual jet cooling effectiveness and the cooling degradation effect which results from spent-jet crossflow. Crossflow degradation refers to the effect of the spent coolant, which increases in mass flow as more jets are added to it, on the remaining coolant jets, an effect which serves to decrease the relative strength of a jet flow compared to the total spent coolant flow, and therefore decreases the cooling ability. Because of this effect, the jet plate must remain a certain distance from the target wall to allow enough volume for the spent coolant flow, such that the spent flow velocity will not degrade the jet velocity. This distance is generally much greater than that which would be desired for more effective cooling performance by the jets.

Additionally, current impingement devices are not thermally or mechanically connected, except by an edge braze or a weld, and accordingly carry negligible thermal and mechanical loads. Furthermore, the offset distance of current impingement devices is typically constant, and at best slightly increasing or decreasing, making it difficult to tailor the impingement device to local cooling needs. Moreover, conventional impingement devices suffer from crossflow degradation of jet impingement heat transfer effectiveness.

Therefore, it is apparent from the above that there exists a need in the art for an impingement device having higher length-to-diameter entry holes. Additionally, an impingement device should be capable of directionalized jet flow, and should reduce spent jet coolant crossflow heat transfer degradation. Furthermore, an impingement device should maintain spacing without crossflow effects. It is a purpose of this invention, to fulfill these and other needs in the art in a manner more apparent to the skilled artisan once given the following disclosure.

SUMMARY OF THE INVENTION

In accordance with this invention, a coolable double walled structure, for use and exposure in a hot gas flow environment, includes a jet issuing wall, and a target wall spaced from the jet issuing wall defining at least one cavity therebetween. The jet issuing wall comprises at least one impingement rail having a greater thickness than the jet issuing wall such that a bottom portion of the impingement rail extends within the cavity formed between the jet issuing wall and the target wall. A number of impingement ports are disposed within each impingement rail to provide flow communication through the jet issuing wall to the target wall. Due to the relatively thick dimensions of the impingement rail, the impingement ports disposed within respective impingement rails can be directionalized so as to provide for local cooling needs. In one embodiment, the entry areas of the impingement ports are bell shaped so as to lower inlet pressure loss. In another embodiment, the exit area immediately surrounding the impingement ports is rounded for lower post-impingement pressure drop.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
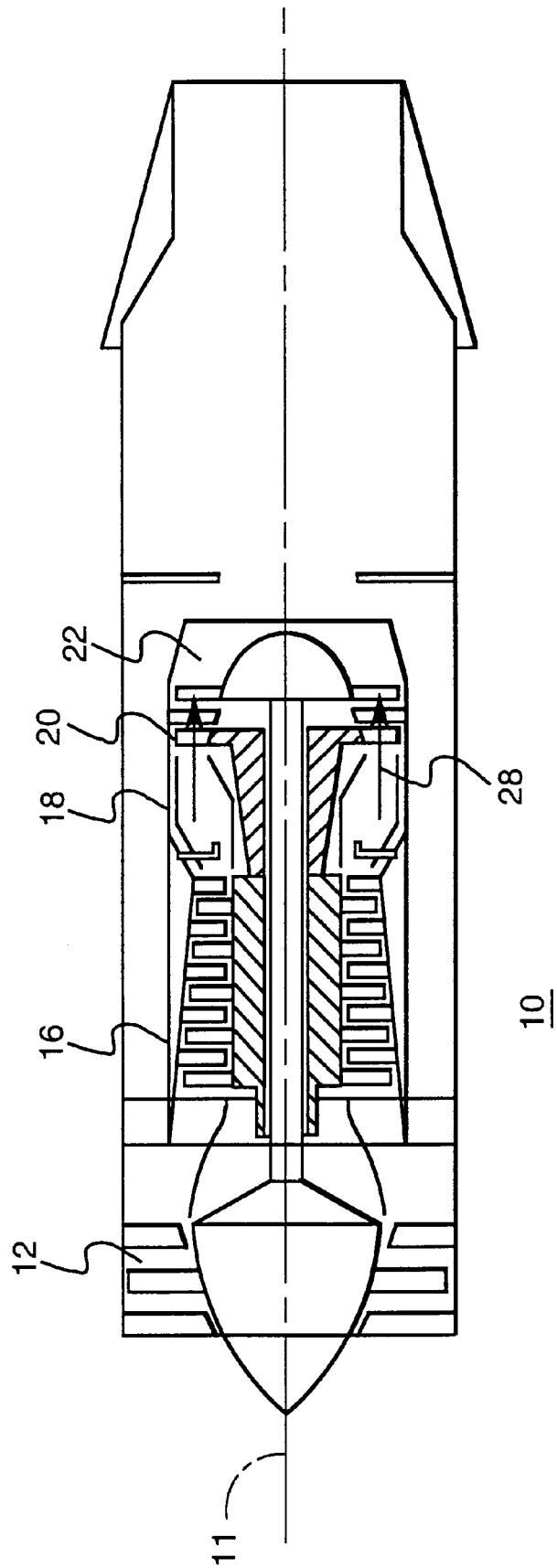
FIG. 1 is a cross-sectional plan view of a turbine engine in accordance with the present invention.

A turbine engine 10, such as a gas turbine used for power generation or propulsion, circumferentially disposed about an engine centerline 11 and having in serial flow relationship a fan section 12, a high pressure compressor 16, a combustion section 18, a high pressure turbine 20, and a low pressure turbine 22, is shown in FIG. 1. In operation, the high pressure compressor 16 draws in fresh air and compresses the air. The air is admitted into the combustion chamber of combustion section 18. In combustion section 18, fuel is burned producing a very hot gas flow, (represented by arrow 28 of FIG. 1), with a temperature frequently greater than about 3900° F. The gas flow is directed at a high velocity into turbine sections 20, 22, which turbine sections 20, 22 in turn harness the energy of the gas flow to drive turbine sections 20, 22 about respective axes of rotation. The use of the instant invention within a system having a high pressure compressor and a low pressure compressor is for illustrative purposes only and is not a limitation of the instant invention.

Figure 2:
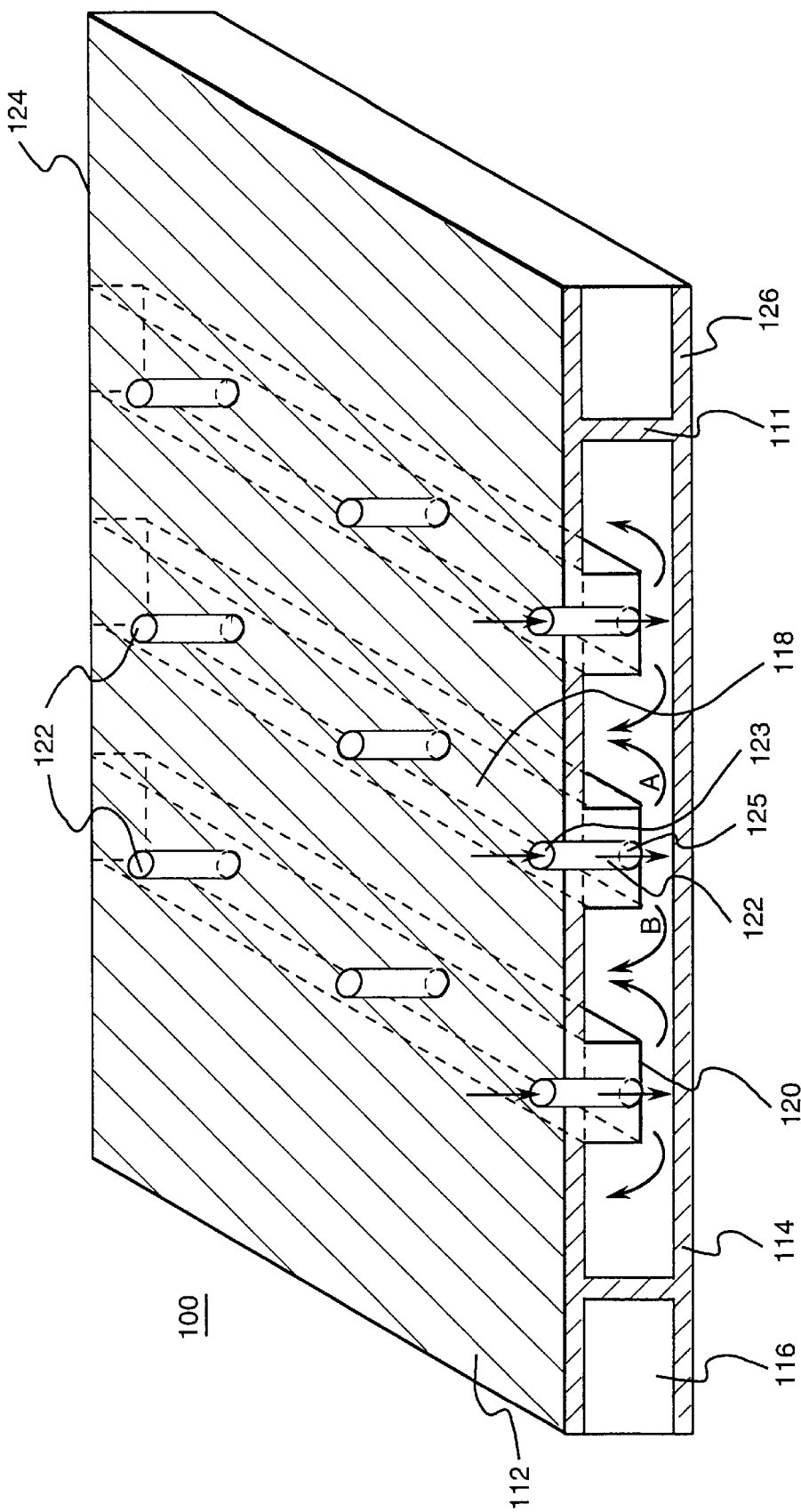
FIG. 2 is a cross-sectional perspective view of a double-walled structure in accordance with one embodiment of the present invention.

A coolable double-walled structure 100 for use and exposure in a hot gas flow environment such as in turbine engine 10, comprises a jet issuing wall 112 and a target wall 114 spaced apart from jet issuing wall 112, as shown in FIG. 2. Target wall 114 in combination with jet issuing wall 112 define a cavity 116 therebetween. In one embodiment, jet issuing wall 112 and target wall 114 are formed of the same material together with tying elements 111 that space apart walls 112, 114 and mechanically and thermally couple walls 112, 114 together. One such arrangement is shown and described in commonly assigned U.S. Pat. No. 5,328,331, entitled "Turbine Airfoil With Double Shell Outer Wall," which patent is herein incorporated, in its entirety, by reference.

In accordance with the instant invention, jet issuing wall 112 comprises at least one, and typically a plurality of, axially extending impingement rails 118 (shown partially in phantom in FIG. 2) disposed within cavity 116 such that a bottom surface 120 of each impingement rail 118 is adjacent target wall 114. At least one, and typically a plurality of impingement ports 122 having an entry area 123 and an exit area 125 are disposed within each respective impingement rail 118. In one embodiment, impingement ports 122 are evenly distributed along impingement rail 118. As noted above, in conventional double wall structures, an impingement coolant flow travels through impingement holes in the outer cool surface (jet issuing wall 112) to the inner hot surface (target wall 114). Conventional impingement holes are essentially flow orifices providing port hole length to diameter ratios generally not exceeding unity, which ratios make directionalized impingement extremely difficult. Due to the depth of impingement rails 118, impingement ports 122 have a relatively large length to diameter ratio, for example in the range of about 2:1 to about 10:1, and preferably in the range of about 3:1 to about 5:1. This relatively large length to diameter ratio allows exit areas 125 of impingement ports 122 to be spaced close to target wall 112 and enables impingement ports 122 to be directionalized to allow cooling air flow to more desirable impingement locations. As used herein, the term "directionalized" refers to impingement ports 122 oriented at a variety of angles within impingement rail 118 to allow cooling air flow to a variety of local impingement locations. Due to the depth of impingement rails 118, the impingement ports 122 have the length to diameter ratios sufficient to develop directional flow so that the jet of cooling flow engages the hot section components in areas such as corner regions near component interfaces or other areas in need of localized cooling.

Impingement rail 118 typically extends longitudinally from a first end 124 of coolable double-walled structure 100 to a second end 126. This embodiment, however, may be modified based on local cooling needs. In one embodiment, impingement rail 118 may be an impingement "island" having only one or two impingement ports 122. The term "island" as used herein refers to a configuration wherein each impingement port or group of impingement ports has an individual section of impingement rail 118 which is isolated from each other respective impingement island and surrounded by cooling flow paths. The crossflow, (discussed in greater detail below), is not minimized in such a configuration, to the same extent as with a longitudinal impingement rail 118, however, the impingement island formation does permit irregular spacing of impingement ports 122.

In conventional double walled structures, post-impingement cross-flow degradation creates significant cooling problems. Due to the post-impingement cross-flow within the inner cavity of a double-walled structure, the impingement flow entering through the impingement holes cannot penetrate the cross-flow to the hot wall. Accordingly, most of the impingement effect is lost due to this cross-flow. Due to the presence of impingement rails 118 within cavity 116, a volume restriction is created that forces post-impingement flow to be channeled between respective impingement rails 118, for example along the path of arrow "A" or arrow "B" in FIG. 2. The channeling or partial channeling of the post-impingement cooling flow significantly reduces crossflow degradation. Because exit area 125 of impingement ports 122 is adjacent to hot target wall 114, a strong jet of impingement cooling flow is directed upon hot target wall 114.

Double-walled structure 100 is suitable for use within most hot section components, including but not limited to vanes, blades, endwalls, shrouds, combustor liners, and transition pieces.

Figure 3:
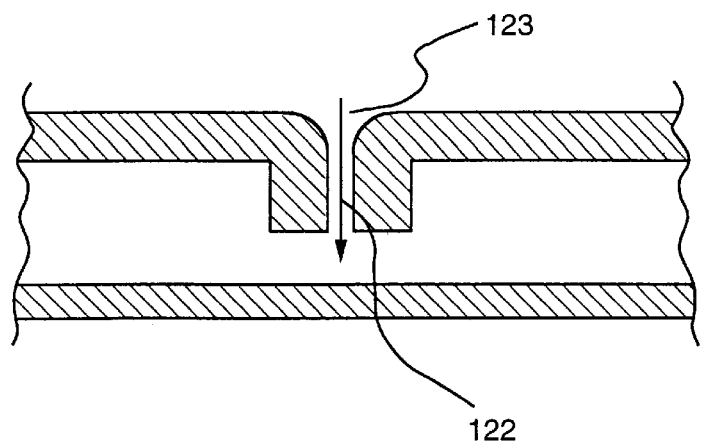
FIG. 3 is a fragmentary cross-sectional plan view of a double-walled structure in accordance with one embodiment of the present invention having an impingement port with a bell-mouth inlet.

In one embodiment of the instant invention, entry areas 123 of impingement ports 122 are bell shaped, as shown in FIG. 3, so as to lower inlet pressure loss. It is known in fluid flow design that a full head loss is taken for sudden sharp entries, whereas only about half of this loss is present for a bell-mouth entry.

Figure 4:
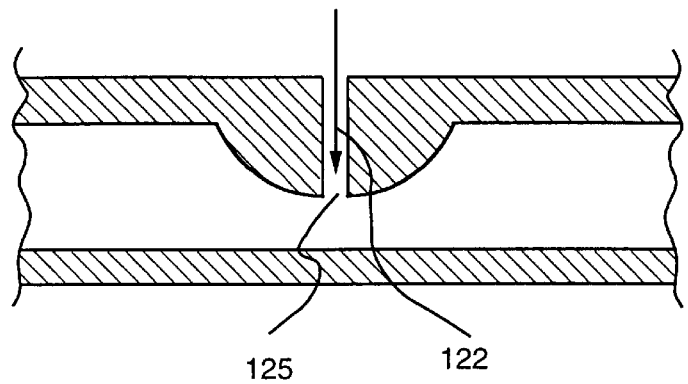
FIG. 4 is a fragmentary cross-sectional plan view of a double-walled structure in accordance with one embodiment of the present invention having an impingement rail with a rounded bottom portion.

In another embodiment of the instant invention, exit area 125 of impingement ports 122 is rounded, as shown in FIG. 4, for lower post-impingement pressure drop. It is known in fluid flow design that flow over and around obstacles that have rounded features rather than sharp edges results in less pressure drop. The post-impingement flow will flow over and around the rail or island containing impingement ports 122.

Figure 5:
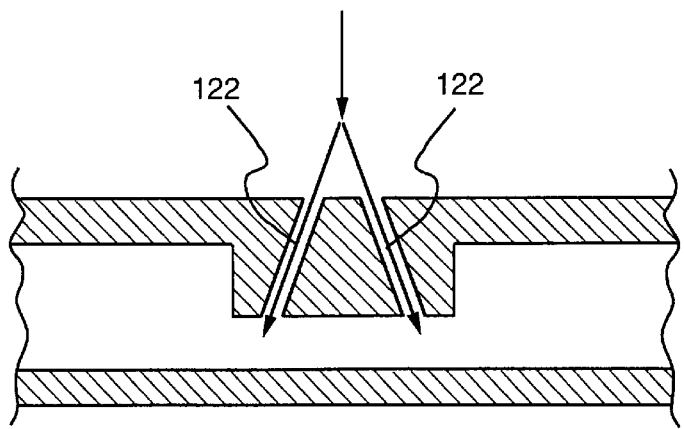
FIG. 5 is a fragmentary cross-sectional plan view of a double-walled structure in accordance with one embodiment of the present invention having directionalized impingement ports.

In another embodiment of the instant invention, impingement ports 122 are directionalized, as shown in FIG. 5, so as to provide for local cooling needs. Directionalization of impingement ports 122 allows accommodation to many specific target wall geometries, such as corner regions near component interfaces. As shown in FIG. 5, multiple ports 122 could be issued from one rail or island. This may reduce the number of such special features required. Also, angling of ports is another means of controlling the resultant cooling effectiveness of the impingement, since impingement cooling tends to decrease in effectiveness as a port is tilted away from the direction normal to a target wall.

Figure 6:
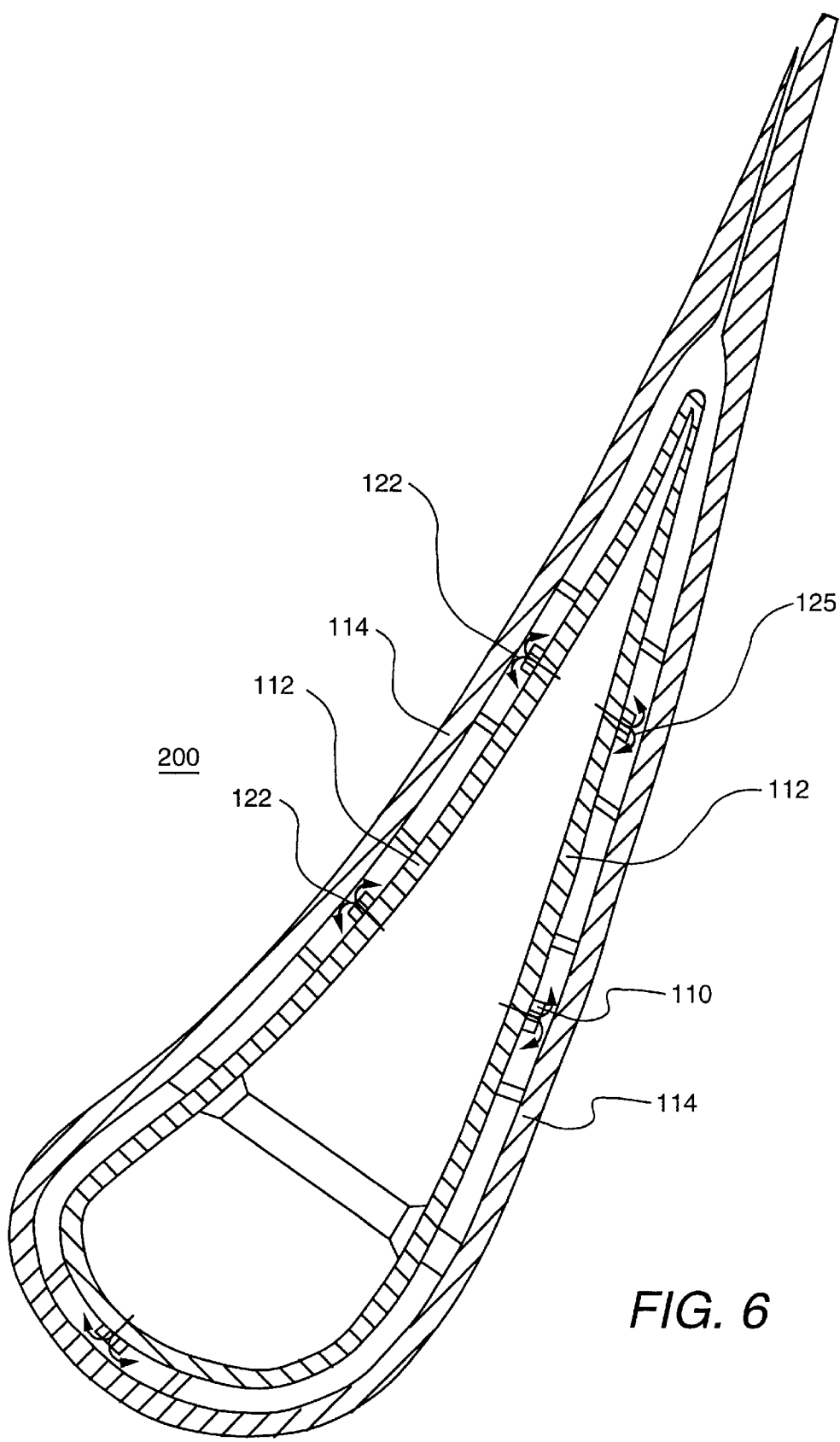
FIG. 6 is a cross sectional plan view of a turbine vane airfoil in accordance with one embodiment of the instant invention.

The exemplary embodiment illustrated in FIG. 6 provides an airfoil 200 having a double shell construction of the instant invention. A coolant flow, typically comprising steam or air, is directed through an admission port (not shown) into airfoil 200. The coolant flow is guided radially by impingement ports 122 through jet issuing wall 112 and directed upon target wall 114 thereby cooling target wall 114 as shown by the arrows of FIG. 6. Heat is removed from the target wall 114 by convection from the impingement cooling ports 122 and by convection due to the post-impingement flow between target wall 114 and jet issuing wall 112. Due to the thickness of impingement rails 110 exit area 125 of impingement ports 122 is relatively close to target wall 114. Accordingly, the post-impingement flow is channeled or partially channeled between each respective impingement rail (see FIG. 2), which channeling significantly reduces crossflow degradation thereby allowing a fresh strong jet of impingement cooling flow to be directed upon hot target wall 114.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. A turbine engine having a coolable double wall structure for use and exposure in a hot gas flow environment, said coolable double wall structure comprising:

a jet issuing wall;

a target wall spaced apart from said jet issuing wall defining a cavity therebetween;

a plurality of longitudinally extending impingement rails disposed on said jet issuing wall such that a bottom portion of each respective impingement rail is adjacent said target wall; and a plurality of impingement ports having an entry area, an exit area and a length to diameter ratio in the range between about 3:1 to about 10:1, said impingement ports disposed within each respective impingement rail to provide flow communication through said jet issuing wall to said target wall.

* * * * *